United States Patent Office 3,327,018
Patented June 20, 1967

3,327,018
FLUORESCENT ALDEHYDE-TRIAZINYL STILBINO CONDENSATION PRODUCTS
Gaetano F. D'Alelio, South Bend, Ind., assignor, by direct and mesne assignments, to Dal Mon Research Co., Cleveland, Ohio, a corporation of Delaware
No Drawing. Filed Mar. 1, 1963, Ser. No. 262,193
15 Claims. (Cl. 260—849)

This invention relates to the production of new synthetic materials and especially to new products having utility in the plastics, coating and impregnating arts.

The compositions of this invention comprise new symmetrical triazine derivatives and the condensation products of an aldehyde, including aldehydes, hydroxy-aldehydes, and aldehyde addition products, e.g., formaldehyde, aldol, glucose, dimethylol urea, trimethylol melamine, etc., with said new triazine derivatives which are derivatives of 1,3,5-triazine having attached thereto at least one aldehyde-reactable group, A, and at least one stilbino group, T; and having the general formula

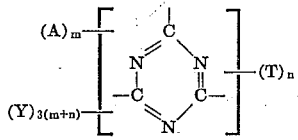

In the above formula, $n$ and $m$ are integers of at least one and no more than two and the sum of $m$ and $n$ does not exceed three, A represents an aldehyde-reactable group, T represents an aromatic group containing a stilbene substituent more fully described hereinafter, and Y represents any monovalent radical.

The only requirement for the triazine derivative of this invention is that it have at least one A group and at least one T group. For purposes of simplicity, the trivalent 1,3,5-triazine, or symmetrical triazine nucleus is sometimes represented hereinafter by $C_3N_3$.

The aldehyde-reactable group is a grouping of atoms or radicals that react with aldehyde or polymeric-aldehydes to form a derivative such as illustrated by the following:

(a)
$$-NH_2 + CH_2H \longrightarrow -NHCH_2OH \xrightarrow{CH_2O} -N(CH_2OH)_2$$

(b)

(c)
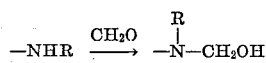

(d)
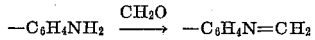

(e)
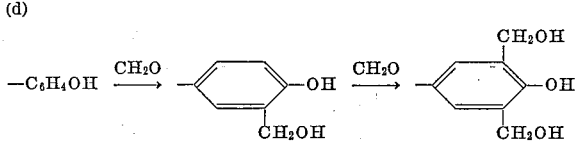

As illustrative examples of the aldehyde-reactable group, A, there are mentioned the following groups:

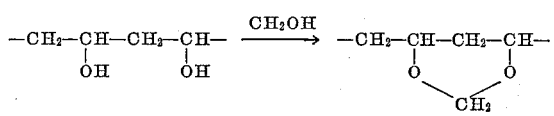

as disclosed in my U.S. Patent 2,295,562, issued Sept. 15, 1942, wherein $x$ is an integer of at least 1 and not more than 2, Y represents a member of the class consisting of oxygen and sulfur, and R represents a member of the class consisting of hydrogen and monovalent hydrocarbon and halohydrocarbon radicals;

as disclosed in my U.S. Patent 2,295,565, issued Sept. 15, 1942, wherein Y represents a member of the class consisting of hydrogen and monovalent hydrocarbon and halohydrocarbon radicals;

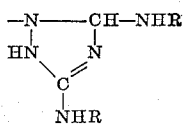

as disclosed in my U.S. Patent 2,295,562, issued Sept. 15, 1942, wherein R represents a member of the class consisting of hydrozen and monovalent hydrocarbon and halohydrocarbon radicals;

as disclosed in my U.S. Patent 2,312,688, issued Mar. 2, 1943, wherein Y represents a member of the class consisting of oxygen and sulfur and R represents a member of the class consisting of hydrogen and hydrocarbon radicals and halohydrocarbon radicals;

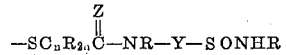

as disclosed in my U.S. Patent 2,312,690, issued Mar. 2, 1943, wherein $n$ represents an integer and is at least one and not more than 2, Z represents a member of the class consisting of oxygen and sulfur, Y represents a bivalent carbocyclic radical, and R represents a member of the class consisting of hydrogen and monovalent hydrocarbon radicals and substituted hydrocarbon radicals;
—NR—Z—SO$_2$NHR, as disclosed in my U.S. Patent 2,312,697, issued Mar. 2, 1943, wherein Z represents an aryl nucleus and R, represents a member of the class consisting of hydrogen and monovalent hydrocarbon radicals and substituted hydrocarbon radicals;

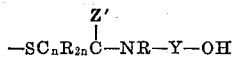

as disclosed in my U.S. Patent 2,312,700, issued Mar. 2, 1943, wherein $n$ represents an integer and is at least one and not more than 2, Z' represents a member of the class consisting of oxygen and sulfur, Y represents a divalent carbocyclic radical and R represents a member of the class consisting of hydrogen and monovalent hydrocarbon radicals and substituted hydrocarbon radicals;
—NHR, as disclosed in my U.S. Patent 2,335,846, issued Dec. 7, 1943, wherein R represents a member of the class consisting of hydrogen and monovalent hydrocarbon radicals and halohydrocarbon radicals;
—Z—CONHR, wherein Z represents a divalent hydrocarbon radical and substituted hydrocarbon radicals;
—B—Z—CONHR, wherein B represents a member of the class consisting of oxygen, sulfur and —NR, Z represents a divalent hydrocarbon radical and substituted hydrocarbon radicals, and R represents a member of the class of hydrogen and monovalent hydrocarbon radicals and substituted hydrocarbon radicals;
HNR—NR—, wherein R represents a member of the class consisting of hydrogen and monovalent hydrocarbon radicals and substituted hydrocarbon radicals;
HO—Z—, wherein Z represents a divalent aromatic radical and substituted hydrocarbon radicals as hereinabove defined. A few typical triazine compounds are

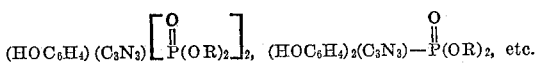

HO—Z—NR—, wherein R represents hydrogen and monovalent hydrocarbon radicals and substituted hydrocarbon radicals, and Z represents a divalent aromatic radical and substituted hydrocarbon radicals as hereinabove described.

A few typical compounds are

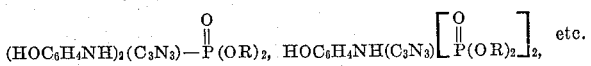

RCONHNR—, wherein R represents hydrogen and a monovalent hydrocarbon radical and substituted hydrocarbon radicals as previously defined hereinabove; $R_2NCY$—NR—CHR'—, as disclosed in my U.S. Patent 2,339,623, issued Jan. 18, 1944, wherein Y represents oxygen or sulfur, at least one R represents hydrogen and the other R's represent hydrogen, a monovalent hydrocarbon radical or a monovalent halogenated hydrocarbon radical, and R' represents hydrogen or a monovalent aliphatic, carbocyclic or aromatic hydrocarbon radical of not more than 6 carbon atoms, etc.;

wherein R represents hydrogen and monovalent hydrocarbon radicals and substituted hydrocarbon radicals;

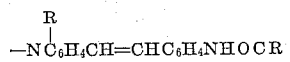

wherein R represents hydrogen and monovalent hydrocarbon radicals and substituted hydrocarbon radicals;

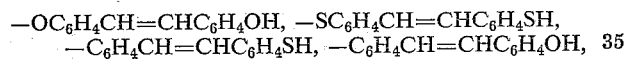

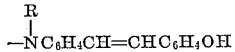

wherein R represents hydrogen and monovalent hydrocarbon radicals, and substituted hydrocarbon radicals.

Thus it may be seen that A may be any aldehyde-reactable group.

In the above triazine derivative formula, Y can be R which represents hydrogen or any monovalent hydrocarbon radical, whether saturated or unsaturated, substituted or unsubstituted, aliphatic, carbocyclic, aryl and heterocyclic, mono- or poly-nuclear, etc. Y preferably contains no more than 20 carbon atoms. Examples of suitable hydrocarbon groups represented by R are aliphatic, cycloaliphatic, aromatic, e.g., methyl, ethyl, propyl, isopropyl, butyl, secondary butyl, butenyl, amyl, hexyl, allyl, methallyl, cyclopentenyl, cyclohexyl, cyclohexenyl, phenyl, diphenyl, naphthyl, tolyl, xylyl, ethylphenyl, propylphenyl, isopropylphenyl, allylphenyl, benzyl, phenylallyl, phenypropyl, etc., and their homologues, as well as those groups with one or more of the hydrogen atoms substituted by halogens, as, for example, fluorine, chlorine, nitro groups, nitroso groups, amino groups, carboxy groups, carbalkoxy groups, alkoxy, cycloalkoxy and aryloxy groups, mercapto groups, etc.; Y can also be hydroxyl and the alkoxy, cycloalkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, the o-, m-, and p-cresols, the xylenols, and naphthols, ethylene glycol, methyl glycol ether, butyl glycol ether, glycerine, pentaerythritol, naphthol, hydroxy pyridine, including the alkoxy and aryloxy radicals of hydroxy acids and esters such as lactic acid, ethyl lactate, allyl lactate, methyl salicylate, and the chloro derivatives such as chlorophenol, chloronapthtol, ethylene chlorohydrin, and the acetoxy derivatives such as acetoxyethyl alcohol, etc., and these radicals are represented by RO—; Y can also be R—S— groups which are the mercapto equivalents to RO—; Y can also be —NR$_2$, that is, an amino group, a monosubstituted amino group or a disubstituted amino group, as for example, the radicals of methylamine, ethylamine, butylamine, nonlyamine, benzyl amine, dimethyl amine, aniline, naphthylamine, ethanol amine, diethanlomanie, diisopropylamine, methylaniline, piperidine, amino- pyridine, and the hydrazine radicals, namely, $R_2NNR$— from hydrazine, unsymmetrical dimethyl hydrazine, symmetrical dimethyl hydrazine, trimethyl hydrazine, phenyl hydrazine; Y can also be the N-radicals of the amino acids, the aminoesters, the amino-amides, and the amino-nitriles, specific examples of which are

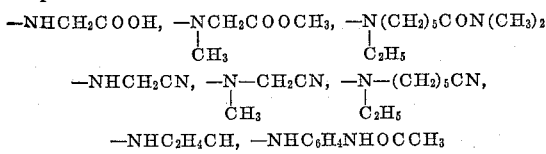

Y can also be radicals of alkylene imines, such as, for example,

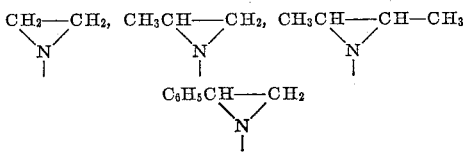

and the radicals of malonic esters and substituted malonic esters, nitriles, and amides, such as, for example,

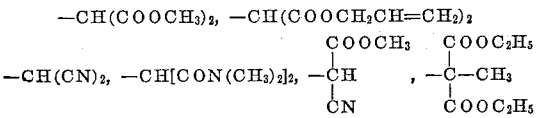

etc.; or Y can be the radical of another triazine ring, e.g., $(CH_3NH)_2(C_3N_3)$—, $(HO)_2(C_3N_3)$—, or the triazine ring can be attached through a bridge, such as

[(CH$_3$)$_2$N]$_2$(C$_3$N$_3$)—NHCH$_2$CH$_2$NH—
(C$_2$H$_5$NH)$_2$(C$_3$N$_3$)—OCH$_2$CH$_2$O—

(H$_2$N)$_2$(C$_3$N$_3$)—NHCH$_2$CH$_2$O— etc.; Y can be an aldehyde non-reactable group containing a fluorescent moiety such as stilbene moiety, e.g.,

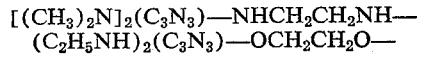

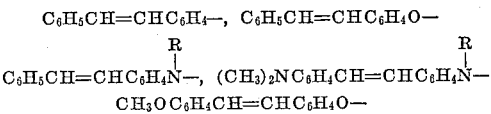

wherein R represents hydrogen, monovalent hydrocarbon radicals and substituted hydrocarbon radicals, or other fluorescent or U.V. absorbing moieties such as the umbelliferones, etc., e.g.,

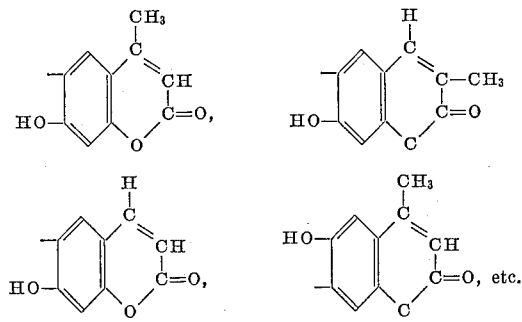

Y can also be chlorine, bromine, —CN, COOR, etc., as well as A and T. Thus, it may be seen that a wide variety of modified triazines can be used in the practice of this invention.

T represents an aromatic group containing the stilbene group moiety —ZCH=CHZ—V, which can be attached to the triazine ring directly or through other atoms, such as through nitrogen, oxygen, sulfur, carbon, selenium, etc., such as, for example,

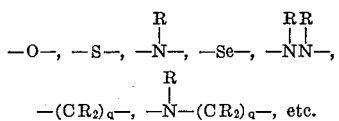

wherein R represents a member of the class consisting of hydrogen, monovalent hydrocarbon radicals and substituted hydrocarbon radicals as previous described, $q$ represents a value of zero to six, Z represents a divalent aromatic hydrocarbon and substituted aromatic hydrocarbon radicals as previously described, and V represents a group selected from the class of A, Y, and

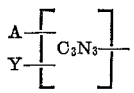

Such connecting groups can be represented by the structure $-(B)_r-Z-CH=CH-Z-(B)_r-V$, wherein B represents $$-O(CH_2)_q-, \quad -NR(CR_2)_q-, \quad -(CR_2)_q-$$

$-S-$, $-Se-$, $-SO-$, and $r$ represents a value of 0 and 1, and $q$, R, V and Z are as previously defined.

Such connecting groups can have substituents thereon, such as chloro, fluoro, alkoxy, aryloxy, acyloxy, nitro, $-SO_3Na$, $-SO_3K$, $-SO_3Li$, etc.

Typical examples of the polyvalent radicals include, but are not restricted to the following:

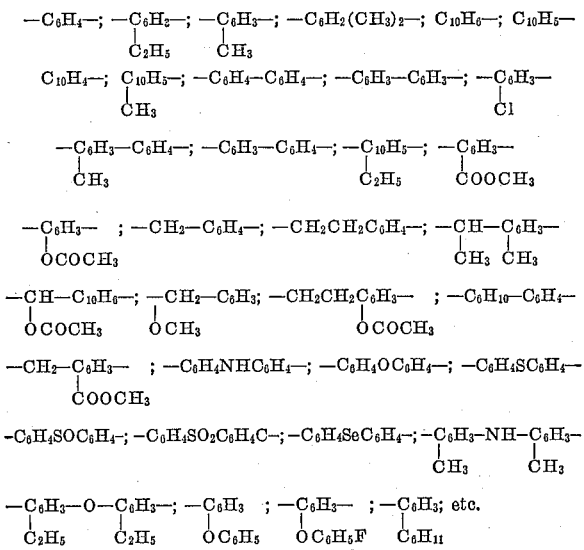

Thus, alternately, the triazine derivatives used in the practice of this invention can be described by the formula

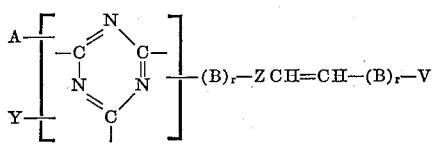

wherein A, Y, B, Z, V and $r$ are as previously defined.

In practicing this invention, the initial condensation reaction can be carried out at normal or elevated temperatures, at atmospheric, sub-atmospheric, or super-atmospheric pressures, and under natural, alkaline, or acid conditions. Preferably, in most cases, the reaction between the components is initiated under alkaline conditions.

Any substance yielding an alkaline or an acid aqueous solution can be used in obtaining alkaline or acid conditions for the initial condensation reaction. For example, an alkaline substance such as sodium hydroxide, potassium carbonate, mono-, di-, or tri-amines, etc., can be used. In some cases, it is desirable to cause the initial condensation reaction between the components to take place in the presence of a primary condensation catalyst and a secondary condensation catalyst. The primary catalyst can be either an aldehyde-non-reactable nitrogen-containing basic tertiary compound, e.g., tertiary amines such as trialkyl (e.g., trimethyl, triethyl, etc.) amines, or an aldehyde-reactable, nitrogen-containing basic compound, for instance, ammonia, primary amines (e.g., ethyl-amine, propyl-amine, etc.) and secondary amines (e.g., dipropylamine, dibutylamine, etc.). The secondary condensation catalyst which ordinarily is used in an amount less than the amount of the primary catalyst, advantageously is a fixed alkali, for instance, a carbonate, cyanide or hydroxide of an alkali metal (e.g., sodium, potassium, lithium, etc.).

Illustrative examples of acid condensation catalysts that can be employed are inorganic or organic acids, such as hydrochloric, sulfuric, phosphoric, acetic, lactic, arcylic, malonic, etc., or acid salts, such as sodium acid sulfate, monosodium phosphate, monosodium phthalate, etc. Mixtures of acids, of acid salts, or acids and acid salts can be employed, if desired.

The reaction between the aldehyde, e.g., formaldehyde, and the triazine derivative can be carried out in the presence of solvents, diluents, fillers, or other natural or synthetic resinous bodies, or while admixed with other materials that also can react with the aldehydic compound or with the triazine derivative, e.g., ketones, urea, thiourea, selenourea, iminourea (guanidine), substituted ureas, thioureas, selenoureas, and iminoureas, numerous examples of which are given in my U.S. Patent 2,322,566, issued June 22, 1943; monoamides of monocarboxylic acids and polycarboxylic acids and polyamides of polycarboxylic acid, e.g., acetamide, halogenated acetamides (e.g., chloroacetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazine compounds, such as are disclosed in my U.S. Patent 2,382,211, issued Aug. 14, 1945; aminotriazines, e.g., melamine, ammeline, ammelide, melem, melam, melon, etc.; phenol and substituted phenols, e.g., the cresols, the xylenols, the tertiary alkylphenols and other phenols, such as mentioned in my U.S. Patent 2,339,441; monohydric and polyhydric alcohols, e.g., butyl propylene glycol, pentaerythritol, polyvinyl alcohol, etc.; amines, including aromatic amines, e.g., aniline, etc., and the like. In such cases, the triazine derivative represents 5–95% by weight of the aldehyde-reactive portion of such mixture.

The modifying reactants can be incorporated with the triazine derivative and the aldehyde to form an intercondensation product by mixing all the reactants and effecting condensation therebetween or by various permutations of reactants. For instance, a partial condensation product can be formed of ingredients comprising (1) urea or melamine or urea and melamine, (2) a triazine derivative of this invention, (3) an aldehyde, including polymeric aldehydes, hydroxy aldehydes and aldehyde-addition products, for instance, formaldehyde, paraformaldehyde, dimethylol urea, polymethylol melamine; and thereafter reaction effected between this partial condensation product and, for example, a curing reactant, specifically a chlorinated acetamide or an amino acid.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting, or potentially thermosetting resinous condensation products, alone or mixed with fillers, pigments, dyes, lubricants, plasticizers, curing agents, etc., can be used, for example, in the production of molding and laminating compositions. In other cases, they can be used as ion exchange resins and as tanning agents.

The liquid intermediate condensation products of this invention can be concentrated by the removal of, or diluted further by the addition of volatile solvents, to form liquid coating compositions of adjusted viscosity and concentration. The heat-convertible or potentially heat-convertible resinous condensation products can be used in the liquid state, for instance, as impregnants for wood, leather, paper and other porous bodies; as surface-coating materials in the production of paints, varnishes, lacquers, enamels, etc.; for general adhesive applications in producing laminated articles, and for other purposes. The liquid, heat-hardenable or potentially heat-hardenable condensation products also can be used directly as casting resins, while those which are gel-like nature in the partially condensed state can be granulated and dried to form clear, unfilled heat-convertible resinous products.

In producing these new condensation products the choice of the aldehyde is largely dependent on economic considerations and upon the particular properties desired in the finished product. Preferred aldehydic reactants are formaldehyde and compounds engendering formaldehyde, e.g., paraformaldehyde, hexamethylene tetramine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes (e.g., aldol, glycose, glycolic aldehyde, glyceraldehyde, etc.), mixtures thereof or mixtures of formaldehyde (or compounds engendering formaldehyde) with such aldehydes. Illustrative examples of aldehyde-addition products that can be used instead of the aldehydes themselves are the mono- and poly-(N-carbinol) derivatives, particularly the mono- and polymethylol derivatives of urea, thiourea, selenourea, and iminourea, and substituted ureas, thioureas, selenoureas, and iminoureas, mono- and poly-(N-carbinol) derivatives of amides or polycarboxylic acids, e.g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines. Particularly good results are obtained with active methylene-containing bodies as a methylol urea, more particularly mono- and dimethylol ureas, a methylol aminotriazine, more particularly a methylol melamine, e.g., monomethylol melamine and polymethylol melamines (di-, tri-, tetra-, penta-, and hexamethylol melamines). Mixtures of aldehydes and aldehyde-addition products can be employed, e.g., mixtures of formaldehyde and methylol compounds, such, for instance, as dimethylol urea, trimethylol melamine, hexamethylol melamine, etc.

The ratio of the aldehydic reactant to the triazine derivative can be varied over a wide range depending upon the particular properties desired in the finished product. Ordinarily these reactants are employed in an amount corresponding to at least one mole of the aldehyde, especially formaldehyde, for each mole of the triazine derivative. Thus, for example, one to seven or eight or more moles of an aldehyde can be used for each mole of the triazine derivative. When an aldehyde is available for reaction in the form of an alkylol derivative, more particularly a methylol derivative such, for instance, as dimethylol urea, trimethylol melamine, etc., than higher amounts of such aldehyde-addition products are used, for instance, from 2 to 3 up to 15 to 20 or more moles of such alkylol derivatives for each mole of the triazine derivative.

As indicated hereinabove, the properties of the fundamental resin can be varied widely by introducing other modifying bodies before, during, or after effecting condensation between the primary components. Thus, modifying agents that can be used include, for example, methyl, ethyl propyl, isopropyl, isobutyl, hexyl, etc., alcohols; polyhydric alcohols, such as, for example, diethylene glycol, triethylene glycol, pentaerythritol, etc.; alcohol ethers, e.g., ethylene glycol monomethyl ether, ethylene glycol monoethyl ether, diethylene glycol monobutyl ether, etc.; amides, such as formamide, stearamide, acrylamide, benzene sulfonamides, toluene sulfonamide, the aryl disulfonamides, adipic diamide, phthalamide, etc., amines, e.g., ethylene diamine, phenyl diamine, etc.; ketones, including halogenated ketones, etc.; nitriles, including halogenated nitriles, e.g., acrylonitrile, methacrylonitrile, succinonitrile, fumaryl nitrile, chloroacetonitriles, etc.; acylatedureas, more particularly halogenated acylated ureas of the kind described in my U.S. Patent 2,851,559, and others.

The modifying bodies also can take the form of high molecular weight bodies with or without resinous characteristics, for example, hydrolyzed wood products, formalized cellulose derivatives, lignin, protein-aldehyde condensation products, aminotriazine, aldehyde condensation products, aminotriazolealdehyde condensation products, polyacrylamide, styrene-maleic imide copolymers, etc. Other examples of modifying bodies are the urea-aldehyde condensation products, the aniline-aldehyde condensation products, furfural condensation products, phenol-aldehyde condensation products, modified or unmodified, saturated or unsaturated polyhydric-alcohol-polycarboxylic acid condensation products, water-soluble cellulose derivatives, natural gums and resins, such as shellac, rosin, etc.; polyvinyl compounds, such as polyvinyl esters, e.g., polyvinyl acetate, polyvinyl butyrate, etc., polyvinyl ethers including polyvinyl acetals, especially polyvinyl formal, etc.

Dyes, pigments, plasticizers, mold lubricants, opacifiers and various reinforcing fillers (e.g., wood flour, glass fibers, including difibrated asbestos, mineral wool, mica, cloth cuttings, glass cloth, glass mat, etc.) can be compounded with the resin in accordance with conventional practice to provide various thermoplastic and thermosetting molding compositions.

The modified and unmodified resinous compositions of this invention have as polymers a wide variety of uses. For example, in addition to their use in the production of molding compositions, they can be used as modifiers of other natural and synthetic polymers, as laminating varnishes in the production of laminated articles wherein sheet materials, e.g., paper, cloth, sheet asbestos, glass mats and glass fibers, etc., are coated and impregnated with the resin, superimposed and thereafter united under heat or heat and pressure. They can be used in the production of wire coatings or baking enamels from which insulated wires and other coated products are made; for bonding or cementing together mica flakes to form a laminated mica article, for bonding together abrasive grains in the production of resin-bonded abrasive articles such, for instance, as grindstones, sandpapers, emery cloths, etc., in the manufacture of electrical resistors, etc. They can also be employed for treating cotton, linen, and other cellulosic materials in sheet or other form. They can also be used as impregnants for electrical coils and for other electrically insulating applications.

The present invention is based on the discovery that new and valuable materials having particular utility in the polymer, plastics, impregnating, and coating arts can be produced by effecting reaction between ingredients comprising an aldehyde, including polymeric aldehydes and aldehyde-addition products, and triazine compounds of the kind described hereinabove.

The modified and unmodified condensation products of this invention have a wide variety of particular uses due to their U.V. absorption and/or internal fluorescence of the polymers. The colorless condensation polymers are transparent, and images may be seen clearly through films of the polymers. Yet in ordinary daylight, sunlight and the ultraviolet lamplight they absorb part of the ultraviolet portion of the spectrum and most of them reemit the energy into the visible spectrum in or near the blue region, and even to the yellow, depending on the nature of the —Z—CH=CH—Z— group, the substituent on the Z groups and the nature and number of

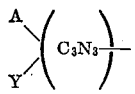

groups and V groups. In this manner, they function also as U.V. screening agents to prevent deterioration of any substance dissolved in the polymer or coated by the polymer, and can perform a dual function as brighteners for the substrate with the added advantage that they can be used in the conventional manner as molding compounds, laminating varnishes, impregnants, inks, etc., alone or with dyes or with other polymers and fillers such as paper, cotton, wood, wool, leather, proteins and the like. Also, they can be used to increase the wet strength of paper and wood pulps while at the same time increasing the brightness and protecting the cellulose from U.V. degradation.

The condensation products of this invention are particularly useful in the production of light responsive fluorescent materials such as daylight fluorescent pigments and coatings for use in silk-screen printing, letter-press inks, paints and the like. Heretofore, fluorescent dyestuffs, dissolved or dispersed in a variety of resinous materials to form a pigment, have been used for this purpose. Normally, fluorescent dyes of this type are deteriorated by sunlight rapidly in outdoor exposures, and the resinous materials in which they are dissolved is believed to provide a protective coating or barrier for the dyestuff to minimize its destruction or deterioration upon exposure to a normal atmospheric environment. Of a large number of commercially available resinous materials, only a very limited number have been found to be usable in the formulation of pigments or vehicles containing the fluorescent dyestuff. Some of the satisfactory condensation aminoplast resins include the urea-formaldehyde, the melamine-formaldehyde, the aryl sulfonamide-formaldehyde, the melamine-aryl sulfonamide formaldehyde, and the urea-melamine-formaldehyde resins in both the thermoplastic and thermosetting modifications. While some of these resins are improvements over the prior resins used in the art, none is, per se, inherently a fluorescent resin or brightening agent which can offer maximum protection to an added non-resinous fluorescent dye. Thus, it is a further object of this invention to produce and to provide a method for producing improved daylight fluorescent pigments, inks and coating compositions, This is achieved by the incorporation of fluorescent dyes into the fluorescent dyes into the fluorescent resins derived from the condensation of aldehydes with the monomers of this invention in the absence or presence of other modifiers, as described hereinabove. Due to the fluoresecent nature of the resin, the daylight-fluorescent dyestuffs appear to be brighter and more intense than similar compositions not containing the resins of this invention. Suitable examples of daylight-fluorescent dyestuffs and their colors include but are not limited by the following:

| Dye: | Color |
|---|---|
| 2,4 disulfo-bonzoic acid | Red. |
| 2,5 disulfo-benzoic acid | Red. |
| Meta diethylaminophenolphthalein hydrochloride | Red. |
| Meta diethylaminophenolsuccein hydrochloride | Red. |
| Eethyl ester of m-monobutylamine phenolphthalein hydrochloride | Orange. |
| Ethyl ester of m-monoethylamine phenolphthalein hydrochloride | Orange. |
| 4 amino 1,8 naphthol 2',4'dimethyl phenylimide | Yellow. |
| Meta aminophenolphthalein hydrochloride | Yellow green. |
| Di(para dimethylaminophenyl)ketoneimine | Yellow green. |
| 2,3-diphenyl N-phenylquinoxalonium sulfate | Green. |

Among the triazine derivatives embraced by the formulas of the various classes of compound used in producing the new condensation products of this invention are the triazine derivatives having substituents indicated by the groups attached to the structure,

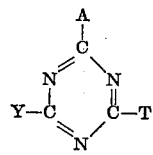

in the following table.

| Substituent A | Substituent Y | T=—Z—CH=CH—Z—V |
|---|---|---|
| —NH₂ | —NH₂ | —NH—C₆H₄—CH=CHC₆H₅ |
| —NH₂ | —NH—C₆H₄—ASO₃H₂ | —NH—C₆H₄—CH=CHC₆H₅ |
| —NHCH₃ | —NHCH₃ | —NH—C₆H₄—CH=CHC₆H₅ |
| —NH₂ | —NH₂ | —N—C₆H₄—CH=CHC₆H₅<br>    |<br>  CH₃ |
| —NH₂ | —NH₂ | NH—C₆H₃—CH=CHC₆H₅<br>    |<br>  CH₃ |
| —NH₂ | —NH₂ | —NH—C₆H₃—CH=CHC₆H₅<br>    |<br>  OH |
| —NH₂ | —NH₂ | NH—C₆H₃—CH=CHC₆H₅<br>    |<br>  Cl |
| —NHCH₃ | —NHCH₃ | —NH—C₆H₄—CH=CHC₆H₅ |
| —NH₂ | —NHCH₂CH₂OH | —NH—C₆H₄—CH=CHC₆H₅ |
| —NH₂ | —NHCH₂COOCH₃ | —NH—C₆H₄—CH=CHC₆H₅ |
| —NH₂ | —NHC₆H₅ | —NH—C₆H₄—CH=CHC₆H₅ |
| —NH₂ | —NHC₆H₄OH | —NH—C₆H₄—CH=CHC₆H₅ |
| —NHC₆H₄OH | —NHC₆H₄OH | —NH—C₆H₃—CH=CHC₆H₅<br>    |<br>  OCH₃ |
| —NHC₆H₃Cl₂ | —NH₂ | —NH—C₆H₄—CH=CHC₆H₅ |
| —NHCH₃ | —NHCH₃ | —N—C₆H₄—CH=CHC₆H₅<br>    |<br>  CH₃ |
| —NHC₆H₅ | —NHC₆H₅ | —NH—C₁₀H₆—CH=CHC₆H₅ |
| —NH₂ | —NH—C₁₀H₇ | —NH—C₆H₄—CH=CHC₆H₅ |
| —NH₂ | —NH₂ | —NH—C₆H₄—CH=CHC₆H₅ |
| —NHCH₃ | —NHCH₃ | —O—C₆H₄—CH=CHC₆H₅ |
| —NHCH₃ | —NHCH₃ | —O—C₆H₄—O—C₆H₄—CH=CHC₆H₅ |
| —NHCH₃ | —NHCH₃ | O—C₆H₄—NH—C₆H₄—CH=CHC₆H₅ |

| Substituent A | Substituent Y | T=—Z—CH=CH—Z—V |
|---|---|---|
| —NH₂ | —NH₂ | —O—C₁₀H₆—CH=CHC₆H₅ |
| —NH₂ | —NH₂ | —S—C₆H₄—CH=CHC₆H₅ |
| —NHC₆H₄OH | —NHC₆H₄OH | —S—C₆H₄—CH=CHC₆H₅ |
| —NHCH₂CH₂OH | —NH₂ | —S—C₆H₄—CH=CHC₆H₅<br>          \|<br>          Cl |
| —NH₂ | —NHCH₂COOH | —Se—C₆H₄—CH=CHC₆H₄NHOCOCH₃ |
| —NH₂ | —NH₂ | —Se—C₆H₄—CH=CHC₆H₄NHOCOCH₃ |
| —NH₂ | —O—C₆H₅—COOCH₃ | —O—C₆H₄—CH=CHC₆H₄NHOCOCH₃ |
| —NH₂ | —S—C₆H₅—COOCH₃ | —S—C₆H₄—CH=CHC₆H₄NHOCOCH₃ |
| —NH₂ | —Se—C₆H₅—COOCH₃ | —Se—C₆H₄—CH=CHC₆H₄NHOCOCH₃ |
| —NHC₆H₅ | —NHC₆H₅ | —O—C₆H₄—CH=CHC₆H₄NHOCOCH₃ |
| —NH₂ | —NH₂ | —O—C₆H₃—CH=CHC₆H₄NHOCOCH₃<br>          \|<br>          OC₂H₅ |
| —NH₂ | —NH₂ | —O—C₆H₃—CH=CHC₆H₄NHOCOCH₃<br>          \|<br>          OC₃H₇ |
| —NH₂ | CH₃O— | —NH—C₆H₄—CH=CHC₆H₄NHOCOCH₃ |
| HOC₆H₇O— | C₂H₅O— | —NH—C₆H₄—CH=CHC₆H₄NHOCOCH₃ |
| HOC₆H₄NH— | ClCH₂CH₂—O— | —N—C₆H₄—CH=CHC₆H₄NHOCOCH₃<br>  \|<br>  CH₃ |
| NH₂OCCH₂O— | CH₂=CH—CH₂—O— | —NH—C₆H₃—CH=CHC₆H₄NHOCOCH₃<br>          \|<br>          OH |
| NH₂OCCH₂S— | CH₂=CH—CH₂—O— | —NH—C₆H₄—CH=CHC₆H₄NHOCOCH₃ |
| HOC₆H₄—S— | C₆H₅O— | —NH—C₁₀H₆—CH=CHC₆H₄NHOCOCH |
| NH₂CONH— | ClC₆H₄O— | —NH—C₆H₄—O—C₆H₄—CH=CHC₆H₄NHOCOCH₃ |
| H₂NSO₂C₆H₄NH— | ClC₂H₄O— | —N—C₆H₄—CH=CHC₆H₄NHOCOCH₃<br>  \|<br>  CH₃ |
| —NH₂ | C₁₀H₇—O— | —NH—C₆H₃—CH=CHC₆H₄NHOCOCH₃<br>          \|<br>          C₂H₅ |
| —NH₂ | CH₃—S— | —NH—C₆H₄—NH—C₆H₄—CH=CHC₆H₄NHOCOCH₃ |
| —NH₂ | C₂H₅—S— | —NH—C₆H₃—CH=CHC₆H₄NHOCOCH₃<br>          \|<br>          OC₂H₅ |
| —NH₂ | C₆H₅—S— | —NH—C₆H₃—CH=CHC₆H₄NHOCOCH₃<br>          \|<br>          OC₂H₅ |
| CH₃CONHNH— | HOC₆H₄O | —NH—C₆H₄—CH=CHC₆H₄NHCONHC₆H₅ |
| H₂NOC\\<br>     CH—<br>H₂NOC/ | (CH₃)₂NC₆H₄—O— |          OH<br>         \|<br>—NH—C₆H₃—CH=CHC₆H₄NHCONHC₆H₅ |
| H₂NOC\\<br>     CH—<br>H₂NOC/ | C₂H₅Se— | —NH—C₁₀H₆—CH=CHC₆H₄NHCONHC₆H₅ |
|    O  OC₂H₅<br>    \\\\  /<br>NH₂—P<br>               | CH₃O— | —NHCH₂—C₆H₄—CH=CHC₆H₄NHCONHC₆H₅ |
|    O  OC₂H₅<br>    \\\\  /<br>NH₂—P | NH₂— | —O(—CH₂)₄NH—C₆H₄—CH=CHC₆H₄NHCONHC₆H₅ |
| —NH₂ | (CH₃)₂N— | —O—C₆H₄—CH=CHC₆H₄OC₄H₉ |
| —NH₂ | (C₂H₅)₂N— | —O—C₆H₄—CH=CHC₆H₄OC₄H₉ |
| —NH₂ | (C₄H₉)₂N— | —O—C₆H₄—CH=CHC₆H₄OC₄H₉ |
| —NH₂ | HO—C₆H₄—N—<br>           \|<br>           CH₃ | —O—C₆H₄—CH=CHC₆H₄OC₄H₉ |
| —NH₂ | CH₃OC₆H₄N—<br>           \|<br>           CH₃ | —NHC₆H₄—CH=CHC₆H₄NHCONH₂ |
| —NH₂ | CH₃COOC₆H₄N—<br>              \|<br>              CH₃ | —NHC₆H₄—CH=CHC₆H₄NHCONH₂ |
| —NH₂ | C₆H₅OC₆H₄—N—<br>            \|<br>           CH₃ | —SC₆H₄—CH=CHC₆H₄NHCONH₂ |
| —NH₂ | HOCH₂CH₂N—<br>           \|<br>           C₆H₅ | —SC₆H₄—CH=CHC₆H₄NHCONH₂ |
| —NH₂ |          CH₂CH₂<br>       /       \\<br>CH₃CON          N—<br>       \\       /<br>         CH₂CH₂ | —SC₆H₄—CH=CHC₆H₄NHCONH₂ |
| —NH₂ | —NHC₆H₄—CH=CHC₆H₄NHCONH₂ | —NHC₆H₄—CH=CHC₆H₄NHCONH₂ |
| —NH₂ | —O—C₆H₄—CONH₂ | —NHC₆H₄—CH=CHC₆H₄NHCONH₂ |
| —NH₂ | —S—C₆H₅—CONHCH₃ | —NHC₆H₄—CH=CHC₆H₄NHCONH₂ |
| —NH₂ | —S—C₆H₃—CONHC₆H₅<br>         \|<br>         Cl | —NHC₆H₄—CH=CHC₆H₄NHCONH₂ |

| Substituent A | Substituent Y | T=—Z—CH=CH—Z—V |
|---|---|---|
| —NH₂ | —NH₂ | —NHC₆H₄CH=CHC₆H₄NH(C₃N₃)(NH₂)₂ |
| —NH₂ | —NHCH₃ | —NHC₆H₄CH=CHC₆H₄NH(C₃N₃)(NH₂)₂ |
| —NHCH₃ | —NHCH₃ | —NHC₆H₄CH=CHC₆H₄NH(C₃N₃)(NH₂)₂ |
| —NH₂ | —Cl | —NHC₆H₄CH=CHNH(C₃N₃)(NH₂)(Cl) |
| —NH₂ | —NH₂ | —NHC₆H₄CH=CHNH(C₃N₃)(NH₂)(Cl) |
| —NH₂ | —NHC₆H₅ | —NHC₆H₄CH=CHNH(C₃N₃)(NH₂)(Cl) |
| —NH₂ | CH₃O— | —C₆H₄—CH=CHC₆H₄NH(C₃N₃)(NH₂)₂ |
| —NH₂ | CH₃S— | —C₆H₄—CH=CHC₆H₄NH(C₃N₃)(NH₂)₂ |
| —NH₂ | CH₃O— | —C₆H₃—CH=CHC₆H₄NH(C₃N₃)(NH₂)₂<br>       \|<br>       Br |
| —NH₂ | CH₃S— | —C₆H₃—CH=CHC₆H₄NH(C₃N₃)(NH₂)₂<br>       \|<br>       CH₃ |
| —NH₂ | C₂H₅—Se— | —C₆H₄C₆H₄—CH=CHC₆H₄NH(C₃N₃)(NH₂)₂ |
| —NH₂ | C₆H₅—S— | —C₁₀H₆—CH=CHC₆H₄NH(C₃N₃)(NH₂)₂ |
| —NH₂ | (CH₃)₂C₆H₃— | —C₆H₃—CH=CHC₆H₄NH(C₃N₃)(NH₂)₂<br>       \|<br>       NO₂ |
| —NH₂ | HOC₆H₄—O— | —C₆H₄—CH=CHC₆H₄NH(C₃N₃)(NH₂)₂ |
| —NH₂ | CH₃OC₆H₄—O— | —C₆H₄—CH=CHC₆H₄NH(C₃N₃)(NH₂)₂<br>       \|<br>       CH₃ |
| —NH₂ | CH₃OC₆H₄—O— | —C₆H₄C₆H₄CH=CHC₆H₄NH(C₃N₃)(NH₂)₂<br>       \|<br>       Cl |
| —NH₂ | CH₃OC₆H₄—O— | —C₆H₂—CH=CHC₆H₄NH(C₃N₃)(NH₂)₂<br>       \|<br>       Cl |
| —NH₂ | CH₃O— | —OC₆H₄CH=CHC₆H₄NH(C₃N₃)(NH₂)₂ |
| —NH₂ | C₂H₅O— | —SC₆H₄CH=CHC₆H₄NH(C₃N₃)(NH₂)₂ |
| —NH₂ | HOCH₂CH₃OCH₂CH₂O— | —OC₆H₃CH=CHC₆H₄NH(C₃N₃)(NH₂)₂<br>       \|<br>       OH |
| —NH₂ | CH₂=CHCH₂O— | —OC₆H₃CH=CHC₆H₄NH(C₃N₃)(NH₂)₂<br>       \|<br>       OH |
| —NH₂ | CH₂=CH—CH₂—OCH₂CH₂O— | —S—C₆H₃—CH=CHC₆H₄NH(C₃N₃)(NH₂)₂<br>       \|<br>       Cl |
| —NH₂ | CH₃COOCH₂CH₂O— | SC₆H₄C₆H₄CH=CHC₆H₄NH(C₃N₃)(NH₂)₂ |
| —NH₂ | CH₃COOC₆H₄ | —SeC₆H₄CH=CHC₆H₄NH(C₃N₃)(NH₂)₂ |
| —NH₂ | ClC₆H₄S— | —OC₆H₄CH=CHC₆H₄NH(C₃N₃)(NH₂)₂ |
| —NH₂ | Cl₂C₆H₃S— | —OC₁₀H₆CH=CHC₆H₄NH(C₃N₃)(NH₂)₂ |
| —NH₂ | C₆H₅O— | —OC₆H₄CH=CHC₆H₄NH(C₃N₃)(NH₂)₂ |
| —NH₂ | CH₃O— | —OC₆H₄CH=CHC₆H₄NH(C₃N₃)(NH₂)₂ |
| —NH₂ | (CH₃)₂N— | —NHC₆H₄CH=CHC₆H₄NH(C₃N₃)(NH₂)₂ |
| —NH₂ | (C₂H₅)₂N— | —NH—C₆H₃—CH=CHC₆H₄NH(C₃N₃)(NH₂)₂<br>       \|<br>       SO₂NH₂ |
| —NH₂ | (C₃H₇)₂N— |        CH₃<br>       \|<br>—N—C₆H₃—CH=CHC₆H₄NH(C₃N₃)(NH₂)₂<br>       \|<br>       Cl |
| —NH₂ | (CH₂=CHCH₂)₂N— | —NHC₆H₃—CH=CHC₆H₄NH(C₃N₃)(NH₂)₂<br>       \|<br>       OH |
| —NH₂ |     CH₃<br>     \\<br>      N—<br>     /<br>    C₆H₅ | —NHC₁₀H₄CH=CHC₆H₄NH(C₃N₃)(NH₂)₂<br>       (Cl)₂ |
| —NH₂ | —NHC₆H₄OH | —NH—C₆H₄—CH=CHC₆H₄NH(C₃N₃)(NH₂)₂ |
| —NHC₆H₄OH | —NHC₆H₄OH | —NH—C₆H₃—CH=CHC₆H₄NH(C₃N₃)(NH₂)₂<br>       \|<br>       OH |
| —NHC₆H₃Cl₂ | —NH₂ | —NH—C₆H₄—CH=CHC₆H₄NH(C₃N₃)(NH₂)₂ |
| —NHCH₃ | —NHCH₃ | —N—C₆H₄—CH=CHC₆H₄NH(C₃N₃)(NH₂)₂<br>       \|<br>       CH₃ |
| —NHC₆H₅ | —NHC₆H₅ | —NH—C₁₀H₆—CH=CHC₆H₄NH(C₃N₃)(NH₂)₂ |
| —NH₂ | —NH—C₁₀H₇ | —NH—C₆H₄—CH=CHC₆H₄NH(C₃N₃)(NH₂)₂ |
| —NH₂ | —NH₂ | —NHCH₂—C₆H₄—CH=CHC₆H₄NH(C₃N₃)(NH₂)₂ |
| —NHCH₃ | —NHCH₃ | —O—C₆H₄—CH=CHC₆H₄NH(C₃N₃)(NH₂)₂ |
| —NHCH₃ | —NHCH₃ | —O—C₆H₄—O—C₆H₄—CH=CHC₆H₄NH(C₃N₃)(NH₂)₂ |
| —NHCH₃ | —NHCH₃ | —O—C₆H₄—NH—C₆H₄—CH=CHC₆H₄NH(C₃N₃)(NH₂)₂ |
| —NH₂ | —NH₂ | —O—C₁₀H₆—CH=CHC₆H₄NH(C₃N₃)(NH₂)₂ |
| —NH₂ | —NH₂ | —S—C₆H₄—CH=CHC₆H₄NH(C₃N₃)(NH₂)₂ |
| —NHC₆H₄OH | —NHC₆H₄OH | —S—C₆H₃—CH=CHC₆H₄NH(C₃N₃)(NH₂)₂ |
| —NHCH₂CH₂OH | —NH₂ | —S—C₆H₃—CH=CHC₆H₄NH(C₃N₃)(NH₂)₂<br>       \|<br>       Cl |
| —NH₂ | —NHCH₂COOH | —Se—C₆H₄—CH=CHC₆H₄NH(C₃N₃)(NH₂)₂ |
| —NH₂ | —NH₂ | —Se—C₆H₄—CH=CHC₆H₄NH(C₃N₃)(NH₂)₂ |
| —NH₂ | —O—C₆H₄—CH=CHC₆H₄N(CH₃)₂ | —O—C₆H₄—CH=CHC₆H₄NH(C₃N₃)(NH₂)₂ |
| —NH₂ | —S—C₆H₄—CH=CHC₆H₄N(CH₃)₂ | —S—C₆H₄—CH=CHC₆H₄NH(C₃N₃)(NH₂)₂ |
| —NH₂ | —Se—C₆H₄—CH=CHC₆H₄N(CH₃)₂ | —Se—C₆H₄—CH=CHC₆H₄NH(C₃N₃)(NH₂)₂ |
| —NHC₆H₅ | —NHC₆H₄—CH=CHC₆H₄N(CH₃)₂ | —O—C₆H₄—CH=CHC₆H₄NH(C₃N₃)(NH₂)₂ |
| —NH₂ | —NHC₆H₄—CH=CHC₆H₄N(CH₃)₂ | —O—C₆H₃—CH=CHC₆H₄NH(C₃N₃)(NH₂)₂<br>       \|<br>       OC₂H₅ |

| Substituent A | Substituent Y | T=—Z—CH=CH—Z—V |
|---|---|---|
| —NH₂ | —NC₆H₄—CH=CHC₆H₄N(CH₃)₂<br>\|<br>CH₃ | —O—C₆H₃—CH=CHC₆H₄NH(C₃N₃)(NH₂)₂<br>\|<br>OC₃H₇ |
| —NH₂<br>—NH₂<br>—NH—C₆H₄—CH=CHC₆H₄NH(C₃N₃)(NH₂)₂ | —NH₂<br>—NH—C₆H₄—CH=CHC₆H₄NH(C₃N₃)(NH₂)₂<br>—NH—C₆H₄—CH=CHC₆H₄NH(C₃N₃)(NH₂)₂ | —NH—C₆H₄—CH=CHC₆H₄NH(C₃N₃)(NH₂)₂<br>—NH—C₆H₄—CH=CHC₆H₄NH(C₃N₃)(NH₂)₂<br>—NH—C₆H₄—CH=CHC₆H₄NH(C₃N₃)(NH₂)₂ |
| —Cl | —NH—C₆H₄—CH=CHC₆H₄NH(C₃N₃)(NH₂)₂ | —NH—C₆H₄—CH=CHC₆H₄NH(C₃N₃)(NH₂)₂ |

The triazine derivatives used in the practice of this invention can be prepared conveniently by condensing the corresponding halotriazine, for example, the chloro-triazines with the corresponding aryl stilbene compound in the presence of a hydrohalide acceptor, such as sodium hydroxide, sodium carbonate, etc., for example, (1) $(A)_2(C_3N_3)Cl + NH_2Z-CH=CH-Z-V \rightarrow$
$(A)_2(C_3N_3)(NHZ-CH=CH-Z-V)$ (2) $(A)(C_3N_3)Cl_2 + 2NH_2Z-CH=CH-Z-V \rightarrow$
$(A)(C_3N_3)(NHZ-CH=CH-Z-V)_2$ (3) $(A)(Y)(C_3N_3)Cl + NH_2Z-CH=CH-Z-V \rightarrow$
$(A)(Y)(C_3N_3)(NHZ-CH=CH-Z-V)$ (4) $(A)(Y)(C_3N_3)Cl + HOZ-CH=CH-Z-V \rightarrow$
$(A)(Y)(C_3N_3)(OZ-CH=CH-Z-V)$ wherein A, Y, Z and V, and $C_3N_3$ are as previously defined. The reaction can be further generalized by the use of the reactant TH wherein T is as previously defined and H is an active hydrogen attached to the group, for example (1) $(A)_2(C_3N_3)Cl + TH \rightarrow A_2(C_3N_3)T$, or
(2) $(A)(C_3N_3)Cl_2 + 2TH \rightarrow (A)(C_3N_3)(T)_2$, or
(3) $(A)(Y)(C_3N_3)Cl + TH \rightarrow (A)(Y)(C_3N_3)T$.

Typical specific examples of the above reactions are:

(1)
$(NH_2)_2(C_3N_3)Cl + NH_2C_6H_4CH=CHC_6H_5 \xrightarrow{NaOH}$
$(NH_2)_2(C_3N_3)NHC_6H_4CH=CHC_6H_5$;

(2)
$NH_2(C_3N_3)(Cl)_2 + 2NH_2C_6H_4CH=CHC_6H_5 \xrightarrow{NaOH}$
$NH_2(C_3N_3)(NHC_6H_4CH=CHC_6H_5)_2$;

(3)
$(NH_2)(HO)(C_3N_3)Cl + NH_2C_6H_4CH=CHC_6H_5 \xrightarrow{NaOH}$
$(NH)(HO)(C_3N_3)NHC_6H_4CH=CHC_6H_5$;

(4)
$2(NH_2)_2(C_3N_3)Cl + NH_2C_6H_4CH=CHC_6H_4NH_2 \xrightarrow{NaOH}$
$(NH_2)_2(C_3N_3)NHC_6H_4CH=CHC_6H_4NH(C_3N_3)(NH_2)_2$;

(5)
$2(NH_2)_2(C_3N_3)Cl + NH_2C_6H_3CH=CHC_6H_3NH_2 \xrightarrow{NaOH}$
                  |                |
                  SO₃Na     SO₃Na
$(NH_2)_2(C_3N_3)NHC_6H_3CH=CHC_6H_3NH(C_3N_3)(NH_2)_2$;
                  |                |
                  SO₃Na     SO₃Na (6)
$(C_3N_3)Cl_3 + 3NH_2C_6H_4CH=CHC_6H_4NHCONHCH_3 \xrightarrow{NaOH}$
$(C_3N_3)(NHC_6H_4CH=CHC_6H_4NHCONHCH_3)_3$ Alternately, these compounds can be prepared by using a halotriazine containing a T group as a substituent and reacting it with a compound containing a reactive hydrogen, represented by MH, wherein M represents Y or A, for example (1)
$Cl_2(C_3N_3)T + 2MH \xrightarrow{\text{hydrohalide acceptor}} M_2(C_3N_3)T$ or (2)
$Cl(C_3N_3)(T)_2 + MH \xrightarrow{\text{hydrohalide acceptor}} M(C_3N_3)T_2$ or (3)
$(A)(Cl)(C_3N_3)T + MH \xrightarrow{\text{hydrohalide acceptor}} (M)(A)(C_3N_3)T$ or (4)
$(Y)(Cl)(C_3N_3)T + MH \xrightarrow{\text{hydrohalide acceptor}} (M)(Y)(C_3N_3)T$ more specifically, for example (1a)
$(Cl_2)(C_3N_3)T + 2C_6H_5NH_2 \xrightarrow{NaOH} (C_6H_5NH)_2(C_3N_3)T$;

(2a)
$(Cl)(C_3N_3)T_2 + NH_3 \xrightarrow{NaOH} NH_2-(C_3N_3)T_2$;

(3a)
$(NH_2)(Cl)(C_3N_3)T + NH_2C_6H_4OH \xrightarrow{NaOH}$
$(NH_2)(T)(C_3N_3)-NHC_6H_4OH$;

(4a)
$(HO)(Cl)(C_3N_3)T + NH_3 \xrightarrow{NaOH} (NH_2)(HO)(C_3N_3)T$;

Illustrative examples of MH compounds are the alcohols, such as $CH_3OH$, $C_2H_5OH$, $(CH_3)_2CHOH$, $C_4H_9OH$, $C_{12}H_{25}OH$, etc., the cycloaliphatic alcohols, such as cyclohexanol, cycloheptanol, cyclopentanol, etc., ammonia and the amines, e.g., $CH_3NH_2$, $C_2H_5NH_2$, $(CH_3)_2NH$, $CH_2=CHCH_2NH_2$, $C_6H_5NH_2$, $CH_3C_6H_4NH_2$ $ClC_6H_4NHCH_3$, cyclohexylamine, etc., together with various other compounds, numerous examples of which are given in my copending application Ser. No. 764,252, filed Sept. 30, 1958, now Patent No. 3,062,775.

A few typical examples are (1b)
$(Cl)_2(C_3N_3)NHC_6H_4CH=CHC_6H_5 + 2NH_3 \longrightarrow$
$(NH_2)_2(C_3N_3)NHC_6H_4CH=CHC_6H_5$ (1c)
$(Cl_2)_2(C_3N_3)NHC_6H_4CH=CHC_6H_4NH(C_3N_3)(Cl_2)_2 + 2NH_3 \longrightarrow$
$(NH_2)(Cl)(C_3N_3)NHC_6H_4CH=CHC_6H_4NH(C_3N_3)(Cl)(NH_2) \xrightarrow{2NH_3}$
$(NH_2)_2(C_3N_3)NHC_6H_4CH=CHC_6H_4NH(C_3N_3)(NH_2)$ (1d)
$(NH_2)(Cl)(C_3N_3)NHC_6H_4CH=CHC_6H_4NH(C_3N_3)(Cl)NH_2 +$
$2C_6H_5OH \xrightarrow{NaOH}$
$(C_6H_5O)(NH_2)(C_3N_3)NHC_6H_4CH=CHC_6H_4NH(C_3N_3)(NH_2)(OC_6H_5)$
etc.

The following examples illustrate the practice of this invention and are given by way of illustration and not by limitation. Unless specifically indicated otherwise, parts and percentages are intended as parts by weight and percent by weight, respectively.

EXAMPLE I

*Preparation of aldehyde-reactable triazine derivatives*

(A) Finely ground 2,4-diamino-6-chloro-1,3,5-triazine (48.3 parts) are suspended in 1000 parts of hot water containing 5 parts of concentrated hydrochloric acid, 2 parts of octyl alcohol and 65 parts of p-aminostilbene, and the mixture refluxed for one hour. The solution is then decolorized with charcoal and filtered hot. The filtered solution is made strongly acid by the addition of 100 parts of concentrated hydrochloric acid. The resulting hydrochloride is removed by filtration and suspended in 1200 parts of hot water and NaOH added until the solution is neutral to Congo red indicator. The precipitated product is then removed by filtration, washed free of chlorides and dried at 100° C. The yield is 95–98% of the theoretical yield of the compound of the formula $(NH_2)_2(C_3N_3)NHC_6H_4CH=CHC_6H_5$ On analysis, the product gives values of 67.1% carbon, 5.24% hydrogen, and 27.3% nitrogen, which are in close agreement with the theoretical values.

(B) The 2,4 - di(4'-amino stilbene)-6-amino-1,3,5-triazine is prepared as follows. Fifty-five (55) parts of 2-amino - 4,6-dichloro-1,3,5-triazine is suspended in 1000 parts of hot water containing 5 parts of commercial hydrochloric acid and 2 parts of octyl alcohol with 77 parts of p-aminostilbene and the mixture refluxed for 2 hours. The solution is then decolorized with activated charcoal, filtered hot, and then made strongly acid by the addition of 100 parts of concentrated hydrochloric acid. After cooling, the salt is removed by filtration and suspended in 1000 parts of water, made neutral to Congo red indicator by adding NaOH, filtered and washed free of chlorides. There is obtained approximately a 70% yield of $NH_2(C_3N_3)[NHC_6H_4CH+CHC_6H_5]_2$ which on analysis gives the values: 77.1% carbon, 17.39% nitrogen, and 5.4% hydrogen. These are in close agreement with the theoretical values.

(C) A solution of 185 parts of cyanuric chloride in 750 parts of acetone is added to 2000 parts of water cooled to 5° C. containing 54 parts of $Na_2CO_3$ and 105 parts of $NH_2C_6H_4CH=CHC_6H_4NH_2$ in a reaction vessel equipped with stirrer, cooling means, etc., and the reaction continued for 3 hours to produce the intermediate $(Cl)_2(C_3N_3)NHC_6H_4CH=CHC_6H_4NH(C_3N_3)(Cl)_2$ after which there is added 150 parts of 28% $NH_3$ solution and the reaction temperature raised to 35–50° C. for 4 hours. There is obtained a slurry of $(NH_2)(Cl)(C_3N_3)NHC_6H_4CH=CHC_6H_4(C_3N_3)(Cl)(NH_2)$ in quantitative yield which can be removed by filtration, washed with water, dried and condensed with aldehydes, if desired, to prepare resinous condensation products.

(D) A slurry of 46.7 parts of
$(NH_2)(Cl)(C_3N_3)NHC_6H_4CH=CHC_6H_4(C_3N_3)(Cl)(NH_2)$ in 500 parts of water containing 10 parts of $NH_3$ are heated at 120° C. in an autoclave for 2 hours and the reaction cooled to room temperature. By filtration there is obtained an almost quantitative yield of $(NH_2)_2(C_3N_3)NHC_6H_4CH=CHC_6H_4NH(C_3N_3)(NH_2)_2$ which gives on analysis, values of 65.21% carbon, 4.59% hydrogen and 39.21% nitrogen, all of which are in close agreement with the theoretical values for the compound. When an equivalent amount of $CH_3NH_2$, $(CH_3)_2NH$, $C_4H_9NH_2$, $C_6H_{11}NH_2$, and $NH_2CH_2CH_2OH$ are used instead of $NH_3$ in this procedure there are obtained respectively the compounds $(CH_3NH)(NH_2)(C_3N_3)NHC_6H_4CH=CHC_6H_4NH(C_3N_3)(NH_2)(NHCH_3)$ $(CH_3)_2N(NH_2)(C_3N_3)NHC_6H_4CH=CHC_6H_4NH(C_3N_3)(NH_2)[N(CH_3)_2]_2$ $(C_4H_9NH)(NH_2)(C_3N_3)NHC_6H_4CH=CHC_6H_4NH(C_3N_3)(NH_2)(NHC_4H_9)$ $(HOCH_2CH_2NH)(NH_2)(C_3N_3)NHC_6H_4CH=CHC_6H_4NH(C_3N_3)(NH_2)(NHCH_2CH_2OH)$ respectively which on analyses for C, H and N gives values in close agreement with the theoretical values for these compounds.

(E) A slurry of 46.7 parts of $(NH_2)(Cl)(C_3N_3)NHC_6H_4CH=CHC_6H_4NH(C_3N_3)(Cl)(NH_2)$ 8.5 parts of NaOH and 20 parts of phenol in 200 parts of water are refluxed for 2 hours. There is obtained the compound $(C_6H_5O)(NH_2)(C_3N_3)NHC_6H_4CH CHC_6H_4NH(C_3N_3)(NH_2)(OC_6H_5)$ which is removed by filtration and dried. When, instead of the phenol, there is used an equivalent amount of $CH_3C_6H_4OH$, $C_6H_5SH$, $HOCH_2COOCH_3$, $HOCH_2CH_2OCH_3$ and $HOC_6H_4CH=CHC_6H_4OCH_3$, there are obtained respectively the compounds $(CH_3C_6H_4O)(NH_2)(C_3N_3)NHC_6H_4CH=CHC_6H_4NH(C_3N_3)(NH_2)(OC_6H_4CH_3)$
$(C_6H_5S)(NH_2)(C_3N_3)NHC_6H_4CH=CHC_6H_4NH(C_3N_3)(NH_2)(SC_6H_5)$
$(NH_2)(OCH_2COOCH_3)(C_3N_3)NHC_6H_4CH=CHC_6H_4NH(C_3N_3)(OCH_2COOCH_3)(NH_2)$
$(CH_3OC_6H_4CH=CHC_6H_4O)(NH_2)(C_3N_3)NHC_6H_4CH=CHC_6H_4NH(C_3N_3)(NH_2)(OC_6H_4CH=CHC_6H_4OCH_3)$ which on analyses for C, N and H gives values in good agreement with the theoretical values for these compounds.

(F) The procedure of Example I–C is repeated using 208 parts of $NH_2C_6H_3(SO_3Na)CH=CH(SO_3Na)C_6H_3NH_2$ instead of $NH_2C_6H_4CH=CHC_6H_4NH_2$. There is obtained the compound $(NH_2)(Cl)(C_3N_3)NHC_6H_3(SO_3Na)CH=CHC_6H_3(SO_3Na)NHC_3N_3(Cl)(NH_2)$ which is converted by the procedure of Example I–D with ammonia and methyl amine respectively, to the compounds $(NH_2)_2(C_3N_3)NHC_6H_3(SO_3Na)CH=CHC_6H_3(SO_3Na)NH(C_3N_3)(NH_2)_2$ and $(CH_3NH)(NH_2)(C_3N_3)NHC_6H_3(SO_3Na)CH=CHC_6H_3(SO_3Na)NH(C_3N_3)(NH_2)(NHCH_3)$ respectively.

(G) A mixture of 46.7 parts of $(NH_2)(Cl)(C_3N_3)NHC_6H_4CH=CHC_6H_4NH(C_3N_3)(Cl)(NH_2)$ and 200 parts of ethyl phosphite (167 parts in excess) is heated to 130° C. until no more ethyl chloride is liberated, following which the mixture is cooled to room temperature. After the product is washed with methanol and dried, there is obtained the product $$(NH_2)\left[\overset{O}{\underset{\|}{P}}-(OC_2H_5)_2\right](C_3N_3)NHC_6H_4CH=CHC_6H_4NH(C_3N_3)\left[\overset{O}{\underset{\|}{P}}-(OC_2H_5)_2\right](NH_2)$$

which is a flame-retardant intermediate that can be reacted with aldehydes to produce flame-retardant resinous compositions. It can also be hydrolyzed with alkalies to the mono- and di-phosphonium salts to give the compounds $$(NH_2)\left(\begin{array}{c}O\\ \| \\ P-OC_2H_5\\ | \\ ONa\end{array}\right)(C_3N_3)NHC_6H_4CH=CHC_6H_4NH(C_3N_3)\left(\begin{array}{c}O\\ \| \\ P-OC_2H_5\\ | \\ ONa\end{array}\right)(NH_2)$$

and

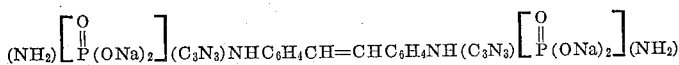

(H) The procedure of Example I–A is repeated with 46.7 parts of $(NH_2)(Cl)C_3N_3)NHC_6H_4CH$
$=CHC_6H_4NH(C_3N_3)(Cl)(NH_2)$ and 45 parts of p-aminobenzene arsonic acid. There is obtained the compound

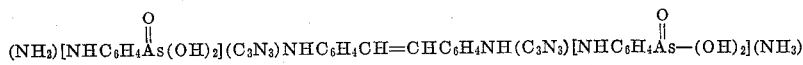

(I) A slurry of 48.3 parts of 2,4 diamino-6-chloro-1,3,5 triazine in 1000 parts of water and 65 parts of p-aminostilbene are refluxed 4 hours, then cooled to room temperature and neutralized with 10% NaOH aqueous solution. A precipitate is obtained of $(NH_2)_2(C_3N_3)(NHC_6H_4CH=CHC_6H_5)$ which is removed by filtration, washed with distilled water and dried.

When, instead of p-aminostilbene, there is used an equivalent amount of $NH_2C_6H_4CH=CHC_6H_4NHOCCH_3$.

$NH_2C_6H_4CH=CHC_6H_4N(CH_3)_2$
$NH_2C_6H_4CH=CHC_6H_4OCH_3$
$NH_2C_6H_4CH=CHC_6H_4NHO_2SC_6H_5$
$NH_2C_6H_3(SO_3Na)CH=CHC_6H_3(SO_3Na)NHOCCH_3$ there are obtained respectively the compounds $(NH_2)_2(C_3N_3)NHC_6H_4CH=CHC_6H_4NHOCCH_3$
$(NH_2)_2(C_3N_3)NHC_6H_4CH=CHC_6H_4N(CH_3)_2$
$(NH_2)_2(C_3N_3)NHC_6H_4CH=CHC_6H_4OCH_3$
$(NH_2)_2(C_3N_3)NHC_6H_4CH=CHC_6H_4NHO_2SC_6H_5$
$(NH_2)_2(C_3N_3)NHC_6H_3(SO_3Na)CH$
$=CHC_6H_3(SO_3Na)NHOCCH_2$ respectively.

By these procedures and related procedures, as disclosed hereinabove and in J.A.C.S., 66, 1771–1778 inc. (1944), and J.A.C.S., 73, 2981–3008 inc. (1951), the triazine compounds used in preparing the resins of this invention, are synthesized.

EXAMPLE II

Twenty-five (25) parts of $(NH_2)_2(C_3N_3)$—$NHC_6H_4CH=CHC_6H_5$ and 32 parts of aqueous formaldehyde (37.2%) are heated together under reflux at the boiling point of the mixture for 30 minutes. A condensation product is obtained that cures to an insoluble, infusible mass when a sample is heated on a hot plate at 150° C. A satisfactory compound that shows adequate flow characteristics during molding is produced by mixing a portion of the resinous syrup with a weight of alpha cellulose equal to the solid content of the syrup, followed by drying at low temperature to remove the excess water. A well-cured, molded piece is obtained by molding a sample of the dried, ground molding compound for 3 minutes at 145° C. under a pressure of 5000 pounds per square inch.

Instead of heating the reactants under reflux, as described above, the mixture can be shaken or stirred for a longer period, for example, 24 to 72 hours or longer at room temperature, to effect reaction between the components and to obtain methylol derivatives as soluble, fusible reaction products which can be heat-hardened. The reaction can also be carried out at lower temperatures, e.g., at 2 to 5° C. for longer periods of time. This condensation is performed preferably in the presence of an alkaline condensation catalyst, such as sodium hydroxide, sodium carbonate, ammonia triethanolamine, hexamethylene tetraamine, etc., although they also can be condensed without the addition of any added catalyst. They can also be condensed under acid conditions and cured, preferably in the presence of acidic curing catalysts, or catalysts which under the influence of the reaction or heat produce acidic substances, such as acetic acid, phthalic acid, ammonium phosphate, ammonium chloride, glycine, chloroacetamide, chloroacetyl urea, etc., although they cure in longer periods of time without added catalysts.

EXAMPLE III

One hundred ninety (190) parts of $(CH_3NH)_2(C_3N_3)NHC_6H_4CH=CHC_6H_5$ 143 parts of $CH_2O$ (37.5% $CH_2O$) and 0.3 part of NaOH in 5.5 parts $H_2O$ are refluxed for 30 to 45 minutes to produce a resin dispersion which, when neutralized with acetic acid and dehydrated, produces a clear thermoplastic resin. This resin is acidified with 1 part of phthalic anhydride and heated further to give a hard resin. This resin is also an effective plasticizer for unmodified melamineformaldehyde or urea-formaldehyde resin. In many cases it is desirable to intercondense this triazine compound directly with the melamine and formaldehyde, or with urea and formaldehyde as shown in subsequent examples.

When an equivalent amount of glyoxal is used instead of formaldehyde in this example, thermosetting compositions are obtained.

EXAMPLE IV

Ninety (90) parts of $(CH_3NH)_2(C_3N_3)NHC_6H_4CH=CHC_6H_5$ 40 parts of urea, 165 parts of aqueous $CH_2O$ (37.5% $CH_2O$), 2.5 parts of aqueous $NH_3$ (28% NH'), and NaOH in 5.5 parts of $H_2O$ are refluxed for 25 minutes to produce a clear syrup. On dehydration it cures slowly at 140° C. but on the addition of chloro-acetamide, the cure is accelerated. The addition of 80 parts of alpha flock to the syrup produces a molding compound, which, after being dried at 70° C. has an excellent cure and good flow when molded at 135° C. for 4 minutes. The product has a glossy surface. When an equivalent amount of thiourea is substituted in the above formula, the type of cure, molding characteristics, and appearance of the molded product obtained is substantially the same as with that of urea.

EXAMPLE V

One hundred figty (150) parts of $(NH_2)_2(C_3N_3)NHC_6H_4CH=CHC_6H_4NHOCCH_3$ 50.8 parts of paratoluene sulfonamide, 190 parts of aqueous $CH_2O$ (37.5% $CH_2O$), and 0.2 part of NaOH in 5.5 parts $H_2O$ are refluxed for one-half hour to produce a syrup which is clear while hot and cloudy on cooling, and has a slow cure. The addition of three parts of phthalic anhydride accelerates the cure.

EXAMPLE VI

One hundred forty-five (145) parts of
$(NH_2)_2(C_3N_3)NHC_6H_4CH=CHCH_6H_4NHOCCH_3$
190 parts of aqueous $CH_2O$ (37.5% $CH_2O$), 29 parts phenol, and 0.3 part NaOH in 6 parts $H_2O$ are refluxed for 25–30 minutes to give a clear syrup whe nhot. At 135° C. the syrup has a prolonged cure but when 2.5 parts of chloroacetamide are added to the composition, a nexcellent cure is obtained.

EXAMPLE VII

One hundred fifty (150) parts of
$(NH_2)_2(C_3N_3)NHC_6H_4CH$
$=CHC_6H_4NHC_3N_3[N(CH_3)_2]_2$ 50 parts malemine, and 210 parts aqueous CH₂O (37.5% CH₂O) are refluxed for 15 minutes. The syrup is clear when hot, when dehydrated cures alone at 135–140° C., and a molding compound containing 100 parts of syrup and 40 parts of alpha flock has excellent flow and cure.

EXAMPLE VIII

One hundred forty (140) parts of (NH₂)₂(C₃N₃)NHC₆H₄CH=CHC₆H₄OCH₃

550 parts of dimethylol urea, 5 parts of NH₃ (in 2.5 parts H₂O), 1000 parts of H₂O (distilled), and 0.35 part of NaOH (in 10 parts H₂O) are mixed and refluxed for 15 minutes. The syrup cures slowly alone at 135° C. but the addition of 3 parts of chloroacetamide accelerates the cure.

EXAMPLE IX

One hundred thirty (130) parts of (H₂N)(H₂NO₂SC₆H₄NH)(C₃N₃)NHC₆H₄CH
=CHC₆H₄NHO₂SC₆H₅

240 parts of aqueous CH₂O (37.5% CH₂O), 2.0 parts of NH₃ in 5 parts of H₂O, and 130 parts of aqueous trimethylol melamine (50% solution) are refluxed for 20–30 minutes. A syrup is obtained which cures slowly alone. The cure is accelerated by ammonium chloride to produce hard resins and molding compounds.

EXAMPLE X

One hundred thirty (130) parts of

NH₂
|
[HOCH₂CH₂NH—C₃N₃—NHC₆H₄CH=]₂

250 parts of aqueous CH₂O (37.5% CH₂O), and 30 parts of glycerine are refluxed for 25–30 minutes to produce a clear resin curing at 135–140° C., which cure is accelerated by the addition of curing agents.

EXAMPLE XI

One hundred twenty-five (125 parts of (NH₂)₂C₃N₃—NHC₆H₄CH
=CHC₆H₄NH—C₃N₃(NH₂)₂

250 parts of aqueous CH₂O (37.5% CH₂O), and 200 parts of butyl alcohol are mixed and refluxed for one-half hour to produce a clear syrup which cures slowly at 135° C. After refluxing, the water is removed from the reaction product by azeotroping the mixture and returning the butyl alcohol to the reaction. The butylated resin is reacted with heat-convertible alkyd resins for coatings and enamels of excellent color retention and durability.

EXAMPLE XII

One hundred twenty-five (125) parts of (HOC₆H₄NH)₂C₃N₃NHC₆H₄CH=CHC₆H₅

150 parts of aqueous CH₂O (37.5% CH₂O), 20 parts of diethyl malonate, and 2.5 parts of NaOH in 20 parts H₂O are refluxed for 20 minutes to produce a condensation product which cures at 140–160° C.

EXAMPLE XIII

One hundred twenty (120) parts of (NH₂)₂C₃N₃—OC₆H₄CH=CHC₆H₄O—C₃N₃(NH₂)₂

140 parts of aqueous CH₂O (37.5% CH₂O), 1.0 part of N₂O, and 15 parts of acetamide are refluxed for 15 minutes to produce a clear syrup which cures alone at 135° C. With phthalic anhydride, chloroacetamide and ammonium chloride, respectively, the cure is excellent.

EXAMPLE XIV

Sixty-five (65 parts of (NH₂)₂C₃N₃NHC₆H₄CH=CHC₆H₄NHC₃N₃(NH₂)₂

68 parts of acrolein, and 0.2 part of NaOH in 5 parts of H₂O are mixed and refluxed for 15 minutes to produce a syrup which cures at 140° C. to a hard tough resin by the additio nof acids or acid producing curing catalysts.

EXAMPLE XV

Fifty (50) parts shellac and 15 parts of

C₆H₅CH=C₆H₄NHC₃N₃(NHCH₂OH)₂ prepared in accordance with the low temperature procedure of Example II, are mixed well and fused at 150° C. At this temperature, the mixture cures to a hard infusible resin. The addition of paraform and hexamethylene tetramine, respectively, hastens the cure.

EXAMPLE XVI

Fifty (50) parts of alkyd resin (e.g., glyceryl phthalate) and 15 parts of

C₆H₅CH=C₆H₄NHC₃N₃(NHCH₂OH)₂ are mixed together and heated on a hot plate at 150° C., and cures to a hard, infusible product. The curing is accelerated by paraform.

EXAMPLE XVII

Thirty-five (35) parts of 1-phenyl guanazole, 35 parts of aqueous formaldehyde (37.5% CH₂O), 2 parts of ammonia (28%), 0.75 part of aqueous NaOH (0.5 N), and the reaction product of Example II are heated together under reflux for 5 minutes at the end of which period separation of a resinous mass occurs. This resin is used satisfactorily for the production of molding compounds.

EXAMPLE XVIII

Twenty-five (25) parts of soya bean protein, 2.5 parts of aqueous ammonia (28% NH₃), 3.0 parts of aqueous NaOH (0.5 N), 250 parts of aqueous CH₂O (37.5% CH₂O) and 80 parts of (NH₂)₂C₃N₃NHC₆H₄CH=CHC₆H₄NHC₃N₃(NH₂)₂ are heated together under reflux at the boiling point of the mixture for 20 minutes. The resulting syrup is mixed with 90 parts of alpha-cellulose and 0.2 part of zinc stearate to form a molding compound which is dried at 70° C. On molding, a well-cured molded piece having a well-knit and homogeneous structure and exhibiting marked fluorcesence is obtained.

EXAMPLE XIX

One hundred (100) parts of (NH₂)₂C₃N₃NHC₆H₄CH=CHC₆H₄NHC₃N₃(NH₂)₂ and 100 parts of aldol are mixed together and then heated for 40 hours at 60° C. The resinous material thereby obtained melts on a hot plate at 140° C., and is converted to an insoluble, infusible state by the addition of chloroacetamide.

EXAMPLE XX

One hundred forty (140) parts of (NH₂)(NHC₆H₄AsO₃H₂)C₃N₃NHC₆H₄CH
=CHC₆H₄NHC₃N₃(NHC₆H₄AsO₃H₂)(NH₂)

80 parts of aqueous CH₂O (37.5% CH₂O), and 20 parts of NaOH in 100 parts H₂O are heated together under reflux at the boiling point of the mixture for 30–45 minutes, yielding a viscous resinous dispersion which can be used directly as a tanning agent as shown in later examples, either as prepared or diluted to the desired concentration of solids. Also, it can be treated with sulfuric acid to liberate the resinous acid having a free arsonic group, which resin can be converted by heating to an insoluble, fusible product suitable as an ion exchange resin. Alternately, the sodium salt can be converted to other salts, such as the calcium, copper, antimony, nickel, etc., by the addition of an aqueous solution of such salts, e.g., copper sulfate, cupric chloride, ferrous acetate, etc. These metallated resins, e.g., the copper resinate, can be used with cellulosic fillers, such as cotton, wood flour, alpha flock, to prepare molding compounds which are fungus and mold-resistant. They can also be used as coating and impregnants for wood as wood preservatives, especially the copper and arsenic salts.

The specific resin of this example, particularly in the form of the polyethylene-imine salt, can also be used to impregnate paper and other fibrous sheet material and thereafter cured by heating to increase the wet strength of the paper. Paper impregnated with the resin in its acid form can be used for the separation and identification of organic bases using the standard paper-chromatography techniques. For these and other uses, this resin can be modified as shown in subsequent examples.

EXAMPLE XXI

Four hundred forty (440) parts of

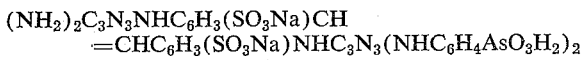
$(NH_2)_2C_3N_3NHC_6H_3(SO_3Na)CH$
$=CHC_6H_3(SO_3Na)NHC_3N_3(NHC_6H_4AsO_3H_2)_2$ 220 parts of aqueous $CH_2O$ (37.5% $CH_2O$), and 80 parts of NaOH in 200 parts $H_2O$ are refluxed for 2 hours to produce a condensation product especially suitable as a tanning agent as prepared or as diluted to the desired concentration.

This specific condensation product contains one arsonic and one sulfonic group, for each triazine ring and therefore can be reacted in part with other metals such as copper and still retain good dispersibility in water and related solvents. Instead of using the triazine derivatives of Examples XX and XXI alone, a mixture of such derivatives can be used to produce a wide variety of condensation products in which the ratio of arsonic to sulfonic groups are varied.

EXAMPLE XXII

One hundred forty (140) parts of

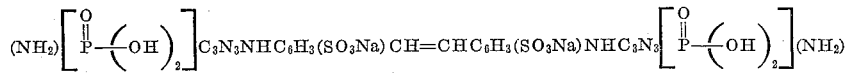

180 parts of aqueous $CH_2O$ (37.5% $CH_2O$), and 70 parts water are mixed in a reaction flask equipped with stirrer and reflux condenser. The mixture is heated to 90° C. for 1 hour and thereafter is cast into a shallow container and heated in an oven until the product is dry and hard. The product is then ground, washed with distilled water, and redried. The resulting acidic ion exchange resin absorbs about 90% of the calculated amount of NaOH from a 5% NaOH solution and then exchanges the sodium ion from calcium, magnesium, copper, silver ions, etc., upon treatment respectively with solutions containing such ions.

This condensation product can be modified by cocondensing the triazine derivative and the aldehyde with other aldehyde reactable substances, including those that have ion exchange resin groups, e.g., urea, melamine, phenol, phenol-sulfonic acid, etc. An amphoteric ion exchange resin is readily prepared by using a second triazine having a multiplicity of groups having ion exchange properties, e.g., a triazine having an amine group, e.g., $(NH_2)_2(C_3N_3)(NH-pyridyl)_2$ The solutions of this example can also be used as tanning agents.

EXAMPLE XXIII

Fifty pounds of pickled sheepskins are placed in a drum with 100 pounds of 5% salt solution and the drum is rotated. There is then added 39 pounds of the condensation product of Example XX, three portions of 13 pounds each at one-half hour intervals, and the drumming continued for 6-8 hours. The skins are then allowed to lie in the liquor for 8-10 hours and then drummed for another one-half hour, after which the skins are drained and washed thoroughly, set out, crusted and finished by the ordinary methods with excellent results. In a similar manner kidskins, calfskins, pigskins, snakeskins, deerskins, bearskins, alligatorskins, sharkskins, etc., are tanned.

The tanning agents of this invention can also be used as a supplementary tannage, for example, for skins that have been given a preliminary chrome or alum tannage, or they can be used in conjunction with other natural or synthetic tannages, as for example:

(A) Fifty pounds of chrome tanned kidskins at the end of tannage and before being dried out are added to 50 pounds of water in a rotating drum together with 8 pounds of the condensation product of Example XX. The drumming is continued for 2 hours after which the skins are washed thoroughly, fat-liquored, set out, crusted, and finished by the ordinary finishing methods with good results.

(B) Fifty pounds of alum tanned calfskins are given a supplementary, excellent tanning using 10 pounds of the condensation product of Example XX, using the procedure used for tanned kidskins.

Instead of the condensation product of Example XX, the condensation products of Examples XXII and XXIV respectively are also used in the above procedures to produce light colored tanned leather which shows high shrink temperatures.

Instead of using the condensation products alone, the products of this invention can be used with other natural and synthetic tanning agents, for example, by using mixtures of liquid quebracho extract with the condensation products of this example. For example, 100 pounds of pickled pigskins are treated with 40 pounds of a mixture of equal parts of liquid quebracho extract and the condensation product of Example XX, in 300 pounds of a 5% salt solution in a rotating drum. Ten pounds of the tanning mixture are added in four equal feeds at intervals of about one-half hour and the drum continued for an additional 4-5 hours, after which the skins are allowed to remain in the liquor for 1-2 hours, then drummed for an additional hour. At the end of the drumming period, the hides are washed thoroughly, fat-liquored, set out, crusted, and finished in the ordinary method with excellent results.

Instead of the quebracho extract used above, synthetic tanning agents can be used, such as the reaction products of aromatic sulfonic acids and aldehydes, for example, phenol-sulfonic acid and formaldehyde. A typical preparation is as follows: to 94 parts of phenol are added slowly 150 parts of 66° Baumé sulfuric acid at room temperature, and upon completion of the addition of the acid, the temperature is raised slowly to 90–100° C. and reacted for 2 hours, after which 70 parts of water and 60 parts of 38% formaldehyde are added and the temperature maintained at 75–85° C. for one hour. The solution is then cooled, the excess sulfuric acid neutralized with sodium hydroxide, and then diluted with water to a 45–47% solids content for use in tanning mixtures containing the condensation products of this invention. Alternately, the aromatic sulfonic acid can be condensed with an aldehyde, for example, phenol sulfonic acid and formaldehyde, initially together with the triazine derivatives of this invention to produce tanning agents with improved color over corresponding aromatic-aldehyde compositions in which the triazine derivatives have been omitted, e.g.:

Ninety-four (94) parts of phenol is heated to 35° C., 150 parts of 66° Baumé sulfuric acid is added slowly, and the temperature raised to 90–100° C., and maintained at this temperature for 2 hours. Seventy parts of water are then added together with 15 parts of $(NH_2)_2C_3N_3NHC_6H_4SO_3H$ and 65 parts of 38% formaldehyde solution and the reaction continued for 2 hours. The solution is then cooled, the excess mineral acid neutralized with sodium hydroxide and the resulting solution diluted to the desired strength. This solution is used directly as a tanning agent as shown hereinabove.

EXAMPLE XXIV

One hundred twenty (120) parts of

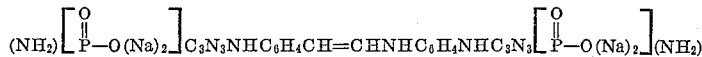

380 parts of aqueous $CH_2O$ (37.5% $CH_2O$), and 60 parts of phenol are mixed, and to the above mixture is added sufficient 20% NaOH solution to adjust the pH to 8–8.5 and the mixture refluxed for 1–2 hours to produce the condensation product.

EXAMPLE XXV

Ninety (90) parts of

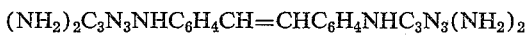

500 parts of dimethylol urea, 1 part of $NH_3$ (in 2.5 parts $H_2O$), 500 parts of $H_2O$ distilled, 200 parts of ethyl alcohol, and 0.5 part of NaOH in 1 part $H_2O$ are refluxed together until a noticeable viscosity increase is observed. Then 20 parts of triethylene tetramine are added and the mixture is neutralized with 10% HCl to a pH of 6. The mixture is cooled to room temperature and used with excellent results as a wet strength resin for papers and cellulosic products of all kinds.

EXAMPLE XXVI

One hundred forty (140) parts of

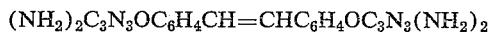

150 parts of aqueous $CH_2O$ (37.5% $CH_2O$), and 20 parts of glycerine are mixed and refluxed for 30 minutes and the condensation products are used directly after dilution to the desired concentration as impregnants for cellulose products.

EXAMPLE XXVII

Eighty (80) parts of

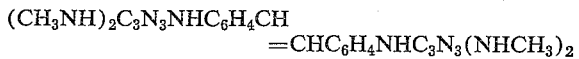

80 parts of aqueous $CH_2O$ (37.5% $CH_2O$), and 5 parts of polyvinyl alcohol in 50 parts $H_2O$ are refluxed for 30 minutes to produce a clear syrup which can be used as an impregnant for wool, silk, cotton, paper, wood, etc.

EXAMPLE XXVIII (a) Two hundred ten (210) parts of a commercial toluene sulfonamide - formaldehyde resin (Santolite MHP—Monsanto Chemical Company), which is an intermediate stage resin, is melted and heated to about 130° C., then 33 parts of $(NH_2)_2C_3N_3NHC_6H_4CH=CHC_6H_5$ are added and held at that temperature until solution occurs and 12 parts of paraformaldehyde added and the reaction continued for 2 hours at 160–170° C. The fluorescent product is cooled to room temperature; the melting point, determined by the ball and ring method, is about 102° C. and the product is soluble in ketone solvents, but insoluble in aliphatic hydrocarbon solvents;

(b) When 24 parts of paraformaldehyde are used in (a) above instead of 12 parts, a melting point of the product of about 105° C. is obtained;

(c) When 66 parts of the triazine instead of 33 parts are used with 20 parts of paraformaldehyde, a melting point of 120° C. is obtained;

(d) When 30 parts of paraformaldehyde is used, a melting point of 145° C. is obtained, respectively, for the fluorescent condensation resins.

EXAMPLE XXIX

The procedure of Example XXVIII is repeated using 210 parts of toluene sulfonamide resin, 43.4 parts of $(NH_2)_2C_3N_3NHC_6H_4CH=CHC_6H_4NHC_3N_3(NH_2)_2$, and 16 parts of paraformaldehyde, a fluorescent condensation product having a melting point of 108° C. is obtained.

EXAMPLE XXX

The procedure of Example XXVIII is repeated using 210 parts of toluene sulfonamide resin, 64 parts of

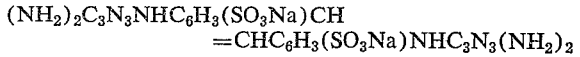

and 14 parts of paraformaldehyde, and a fluorescent resin, insoluble in mineral spirits is obtained.

EXAMPLE XXXI

One hundred sixty (160) parts of a mixture of o- and p-toluene sulfonamide and 16 parts of $(NH_2)_2C_3N_3NHC_6H_3(SO_3Na)CH$
$=CHC_6H_3(SO_3Na)NHC_3N_3(NH_2)_2$ are heated to 125° C. and 45 parts of paraformaldehyde added slowly during a period of 30 minutes. The temperature is then raised to 160° C. for 15 minutes, and the mass cooled. The resin has a softening point of about 110° C.

EXAMPLE XXXII

If, to each of 100 parts of each of the resins of Examples XXVIII, XXIX, XXX, and XXXI, when molten at 160–170° C. during their preparation, is added respectively the following parts of the following dyes, strongly fluorescent pigments of the colors indicated are obtained:

| Dye: | Color |
|---|---|
| (a) 1 part malachite green (color index 657) | Green. |
| (b) 3.1 parts brilliant yellow 6 G base | Lemon yellow. |
| (c) 0.32 part rhodamine B extra; 1.1 parts brilliant yellow 6 G base | Fiery orange. |
| (d) 1 part rhodamine B extra (color index 749); 1 part rhodamine 6 GDN extra | Blue red. |
| (e) 2.1 parts brilliant yellow 6 G base; 0.225 part rhodamine 6 GDN extra (color index 752) | Orange yellow. |

These resinous fluorescent pigments are insoluble in water and aliphatic hydrocarbons, but are soluble in ketones and lower esters. When the resins of Examples XXVIII to XXXII inclusive are ground, they rupture into conchiodal fragments and process most satisfactorily in further reduction on "paint" mills.

Depending on the particular characteristics of the resins alone or with added dyes of all kinds, including fluorescent dyes or with or without pigments, the resins may be used in vehicles which are non-solvents to prepare various inks and coatings, or they can be dissolved in solvent-type volatile vehicles to form coating compositions, or they can be used in intermediate form while still water-soluble or water-dispersible to form inks or other types of coating compositions.

EXAMPLE XXXIII

This example illustrates the preparation of silk screen lacquers.

(a) There are mixed 224 parts of polyacrylic resin solution (Acryloid F–10)
150 parts of pigment of Example XXXII–a (or b, c, d, or e)
3.6 parts of expanded silica gel (Santocel 54)
20.4 parts of mineral spirits and ground over a three-roll mill. The resulting silk-screen inks have brilliant shades and can be used, most effectively, in silk screen printing and the like.

(b) Alternately, a silk screen fluorescent ink can be made using alkyd resins by mixing the following ingredients.

19.8 parts of aluminum stearate gel
95.1 parts of long oil-(soya type) alkyd resin (50% solid)
0.6 part of metal naphthenate driers
15.0 parts of mineral spirits
101.4 parts pigments of Example XXXII and milling the mixture.

EXAMPLE XXXIV

A letter-press ink is prepared using the polymers and pigments of this invention by mixing the following 57.0 parts of pigments of Example XXX-a
64.5 parts of quickset varnish
27.65 parts of high gloss varnish
1.8 parts of metal drier (cobalt naphthenate 3% solution)

which are ground on a three-roll mill until a reading of 7 NS is obtained on a Hegman gauge. The resulting ink performs very well on any conventional letter press.

EXMPLE XXXV

A clear colorless fluorescent coating lacquer is prepared by mixing the following components:

15 parts of colorless fluorescent resin of Example XXVIII
20 parts of low viscosity cellulose butyrate
10 parts of dioctyl phthalate
22 parts of methyl ethyl ketone
22 parts of ethyl acetate
10 parts of toluene and stirring until solution is homogeneous, followed by filtration. This brushable composition can be changed to a sprayable composition by dilution with 20–25 parts of a 50–50 mixture by weight of ethyl acetate and methylethyl ketone.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims.

The invention claimed is:

1. A fluorescent composition of matter comprising the resinous reaction product of a mass comprising an aldehyde and a derivative of a symmetrical triazine having the trivalent formula

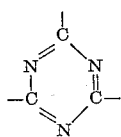

wherein at least one of said three valencies is attached to an aldehyde-reactable group, and at least one of said valencies is attached to a stilbene-substituent group having the formula $$\{(B)_r Z - CH = CH - Z(B)_r - V\}$$

wherein $(B)_r$ represents

—O(CR$_2$)$_q$—, —NR(CR$_2$)$_q$—, —(CR$_2$)$_q$—,
—NR—, —O—, —S—, —Se—, —SO$_2$— wherein $r$ represents an integer selected from the class consisting of 0 to 1, $q$ represents an integer selected from the class consisting of 0 to 6, R has no more than 20 carbons atoms and represents a member of the class consisting of hydrogen, monovalent hydrocarbon radicals and substituted hydrocarbon radicals, Z represents a divalent aromatic hydrocarbon radical and substituted aromatic hydrocarbon radical the substituent groups in said substituted aromatic-hydrocarbon radical each being selected from the class consisting of hydrocarbon radical and halogen radical, V represents a group selected from the class of A, Y and

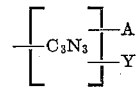

A represents an aldehyde reactable group, and
Y represents a monovalent radical.

2. A composition of claim 1 in which the triazine derivative is $(NH_2)_2(C_3N_3)NHC_6H_4CH=CHC_6H_5$.

3. A composition of claim 1 in which the triazine derivative is $(CH_3NH)_2(C_3N_3)NHC_6H_4CH=CHC_6H_5$.

4. A composition of claim 1 in which the triazine derivative is $(NH_2)_2C_3N_3-OC_6H_4CH=CHC_6H_4O-C_3N_3(NH_2)_2$ 5. A composition of claim 1 in which the triazine derivative is $(NH_2)_2(C_3N_3)NHC_6H_4CH=CHC_6H_4NH(C_3N_3)(NH_2)_2$ 6. A composition of claim 1 in which said aldehyde comprises formaldehyde.

7. A composition of claim 2 in which said aldehyde is formaldehyde.

8. A composition of claim 3 in which said aldehyde is formaldehyde.

9. A composition of claim 4 in which said aldehyde is formaldehyde.

10. A composition of claim 5 in which said aldehyde is formaldehyde.

11. A composition of claim 1 in which the triazine derivative is $Cl(NH_2)(C_3N_3)NHC_6H_4CH=CHC_6H_4NH(C_3N_3)(NH_2)Cl$ 12. A composition of claim 11 in which said aldehyde is formaldehyde.

13. A composition of claim 1 in which the triazine derivative is $(NH_2)[(HO)_2AsC_6H_4NH](C_3N_3)NHC_6H_4$
$CH=CHC_6H_4(C_3N_3)[NHC_6H_4As(OH)_2]NH_2$ 14. A composition of claim 1 in which said mass also comprises a polyalkylene imine.

15. A heat-cured composition of claim 2.

References Cited

UNITED STATES PATENTS

| | | | |
|---|---|---|---|
| 2,473,475 | 6/1949 | Keller et al. | 260—249.5 |
| 2,482,252 | 9/1949 | Edgar | 260—45.2 |
| 2,526,668 | 10/1950 | Keller et al. | 260—249.5 |
| 2,809,954 | 10/1957 | Kazenas | 260—45.2 |
| 2,855,375 | 10/1950 | Dobay | 260—30.8 |
| 2,915,502 | 12/1959 | Albrecht | 260—67.6 |
| 2,938,873 | 5/1960 | Kazenas | 252—301.2 |
| 2,983,686 | 5/1961 | Konig et al. | 252—301.2 |
| 3,017,380 | 1/1962 | D'Alelio | 260—849 |
| 3,050,488 | 8/1962 | Graham | 260—30.8 |
| 3,053,796 | 9/1962 | D'Alelio | 260—45.4 |
| 3,082,190 | 3/1963 | Boldizar | 260—67.6 |
| 3,108,987 | 10/1963 | Galli et al. | 260—45.4 |

WILLIAM H. SHORT, *Primary Examiner.*

M. A. BRINDISI, *Examiner.*

H. SCHAIN, R. D. EDMONDS, *Assistant Examiners.*